United States Patent [19]
Tatah

[11] Patent Number: 5,519,724
[45] Date of Patent: May 21, 1996

[54] MULTIWAVELENGTH AND MULTIBEAM DIFFRACTIVE OPTICS SYSTEM FOR MATERIAL PROCESSING

[75] Inventor: Abdelkrim Tatah, Arlington, Mass.

[73] Assignee: Panasonic Technologies, Inc., Princeton, N.J.

[21] Appl. No.: 284,828

[22] Filed: Aug. 2, 1994

[51] Int. Cl.$^6$ .................................................. H01S 3/08
[52] U.S. Cl. ........................... 372/102; 372/98; 372/22; 372/34
[58] Field of Search ............................. 372/21, 22, 102, 372/103, 98, 34, 18

[56] References Cited

U.S. PATENT DOCUMENTS

| | | | |
|---|---|---|---|
| 4,649,351 | 3/1987 | Veldkamp et al. | 372/18 |
| 4,862,467 | 8/1989 | Carter et al. | 372/18 |
| 4,895,790 | 1/1990 | Swanson et al. | |
| 5,003,060 | 3/1991 | Vinot. | |
| 5,108,187 | 4/1992 | Hirst. | |
| 5,116,461 | 5/1992 | Lebby et al. | |
| 5,151,917 | 9/1992 | Perilloux et al. | 372/102 |
| 5,218,471 | 6/1993 | Swanson et al. | |
| 5,257,132 | 10/1993 | Ceglio et al. | |
| 5,278,679 | 1/1994 | Davis et al. | |
| 5,387,998 | 2/1995 | Kitaoka et al. | 372/22 |

Primary Examiner—Leon Scott, Jr.
Attorney, Agent, or Firm—Ratner & Prestia

[57] ABSTRACT

A laser apparatus having a laser that generates at least one laser beam of a fundamental wavelength, a diffractive optical element that converts the laser beam into a plurality of light beams at the fundamental wavelength, and a harmonic crystal that converts the plurality of light beams at the fundamental wavelength into respective light beams having respective wavelengths which are harmonically related to the fundamental wavelength. By splitting the laser beam into a plurality of beams before converting to harmonic wavelengths using the harmonic crystal, the crystal volume is more efficiently used and the thermal stress on the crystal is reduced. In an alternative embodiment, the invention provides for the use of a plurality of harmonic crystals in series to convert the wavelength to shorter harmonics. The apparatus employs a method of generating a plurality of laser light beams at a plurality of wavelengths comprising by generating at least one laser light beam at a fundamental wavelength, converting that laser light beam into a plurality of light beams at the fundamental wavelength using a diffractive optical element, and converting the plurality of light beams at the fundamental wavelength into a plurality of light beams which are harmonically related to the fundamental wavelength using a harmonic crystal.

11 Claims, 2 Drawing Sheets

MULTIWAVELENGTH AND MULTIBEAM DIFFRACTIVE OPTICS SYSTEM FOR MATERIAL PROCESSING

FIELD OF THE INVENTION

This invention relates to the generation of laser light beams for treating materials and, more particularly, to the generation of laser light beams using a diffractive optical element to generate a plurality of fan-out beams at a fundamental wavelength, and using one or more harmonic crystals to convert the fan-out beams at a fundamental wavelength to beams of harmonic wavelengths.

BACKGROUND OF THE INVENTION

A known method of material treatment involves heating a particular material to a desired temperature at the location where treatment is desired. Examples of such heat treatment include soldering metallic parts, curing epoxy resins, removing plastic coatings from metals, and boring holes in solid materials. A known method of heat treatment involves focusing a laser beam on the material at the location where treatment is desired.

A particularly advantageous type of laser material processing involves the use of one or more harmonic generators to convert the energy of a laser beam having a fundamental wavelength of $\lambda$ into the energy of beams having harmonic wavelengths such as $\lambda/2$, $\lambda/3$, $\lambda/4$ and shorter wavelengths. The beams of different wavelengths are selectively used to treat materials requiring a particular wavelength beam for adequate treatment. Typically, harmonic crystals are used as the harmonic generators.

Another advantageous type of laser material processing involves the use of a diffractive optical element to convert single laser beams into a plurality of fan-out beams. The plurality of beams are then used, for example, to treat a plurality of locations on the material being treated.

Diffractive optical elements are used in many applications, such as optical connectors for computing hardware or for shaping laser beams. A body of literature exists discussing the use of diffractive optical elements to generate fan-out beams. Such references include M. P. Dames, R. J. Dowling, P. McKee, and D. Wood, "Efficient Optical Elements to Generate Intensity Weighted Spot Arrays: Design and Fabrication," Appl. Opt. 30, 2685–2691 (1991) (describing a simulated algorithm to generate a diffractive optic mark design); and K. Rastani, A. Marrakchi, S. F. Habiby, W. M. Hubbard, H. Gilchrist, and R. E. Nahory, "Binary Phase Fresnel Lenses for Generation of Two-dimensional Beam Arrays," Appl. Opt. 30, 1347–1354 (1991) (describing a technique using e-beam lithography and plasma etching to build diffractive elements in glass).

In all such references of which applicants are aware, however, the diffractive optical elements are used external to the laser unit or resonator. This means that when a laser apparatus is used that incorporates both a diffractive optical element and a harmonic generator discussed above, such as a harmonic crystal, the diffractive optical element is used to diffract the laser beam only after the harmonic crystal converts the beam to one of a harmonic wavelength.

The disadvantage of such systems is that the laser beam at the fundamental wavelength is focussed on the harmonic crystal before being diffracted by the diffractive optical element. This damages the harmonic crystal because the high intensity of the fundamental wavelength beam often causes thermal stress on the crystal and coating in these single beam harmonic generation systems. In addition, in order to generate a plurality of fan-out beams at a plurality of wavelengths in such systems, a plurality of diffractive optical elements are required. A separate diffractive optical element must be used for light beams at each wavelength. This increases the cost of the system.

SUMMARY OF THE INVENTION

The present invention provides a laser apparatus having a laser that generates at least one laser beam of a fundamental wavelength, a diffractive optical element that converts the laser beam into a plurality of light beams at the fundamental wavelength, and at least one harmonic crystal that converts the plurality of light beams at the fundamental wavelength into respective light beams having respective wavelengths which are harmonically related to the fundamental wavelength. In an alternative embodiment, the invention provides for the use of a plurality of harmonic crystals in series to convert the wavelength to shorter harmonics.

The invention further provides a method of generating a plurality of laser light beams at a plurality of wavelengths by generating at least one laser light beam at a fundamental wavelength, converting that laser light beam into a plurality of light beams at the fundamental wavelength using a diffractive optical element, and converting the plurality of light beams at the fundamental wavelength into a plurality of light beams which are harmonically related to the fundamental wavelength using at least one harmonic crystal.

DETAILED DESCRIPTION OF THE INVENTION

The present invention provides a laser apparatus for generating a plurality of light beams at a plurality of wavelengths. A diffractive optical element is used to produce fan-out beams that can be converted to harmonic wavelengths by harmonic crystals. The fan-out beams are converted to harmonic wavelengths in parallel and are adapted to be focused on a plurality of treatment locations simultaneously or on the same material in series. By splitting the laser beam into a plurality of beams using a single diffractive optical element before converting to harmonic wavelengths using the harmonic crystal, the crystal volume is more efficiently used, the thermal stress on the crystal is reduced, and cost of the system is reduced.

Figure 1:
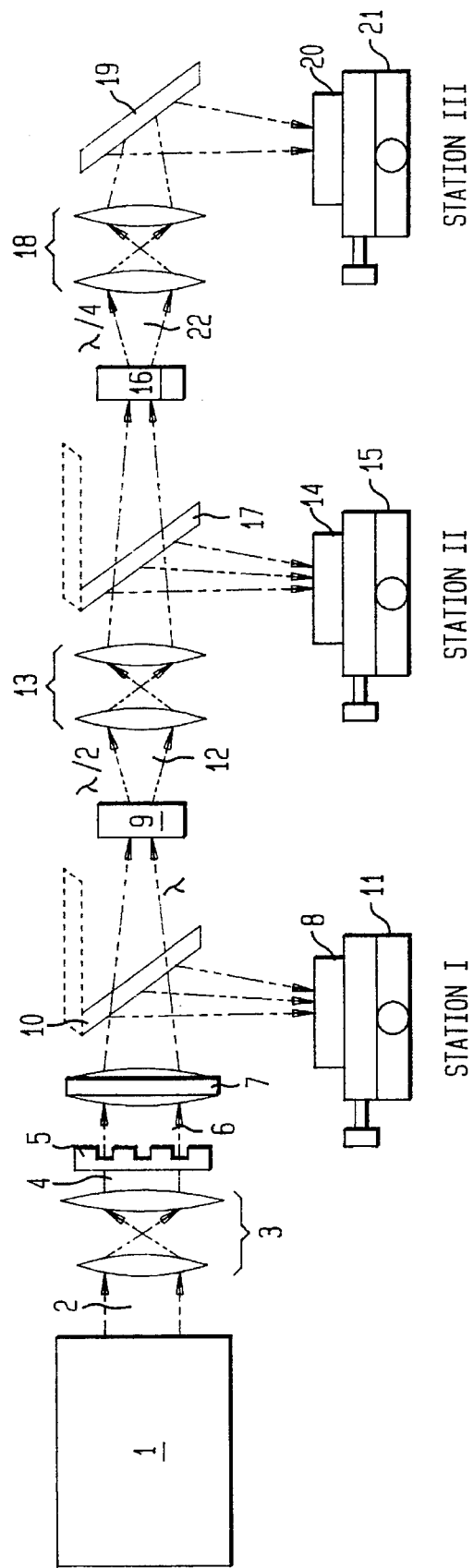
FIG. 1 is a side plan view of an exemplary embodiment of laser apparatus which includes an embodiment of the present invention.

Referring to FIG. 1, a laser 1 produces a laser beam 2. Laser 1 may be any laser known in the art. Laser beam 2 is expanded and collimated by beam expander-collimator 3 which includes a collimating lens (not shown) to produce expanded and collimated laser beam 4. Expander-collimator 3 may be any such device known in the art.

Beam 4 enters and fills diffractive optical element 5. In the illustrated embodiment, diffractive optical element 5 is a diffractive optical mask. In general, diffractive optical elements are created by etching micropatterns of specific depths in a substrate such as glass. In the illustrated embodiment, the lithography and etching process used in semiconductor fabrication, as outlined in U.S. Pat. No. 4,895,790, was used to make the diffractive optical mask. The '790 patent is hereby incorporated by reference into the present application for its teaching of lithography and etching.

In this exemplary embodiment of the invention, an optimization computer program such as a simulated annealing algorithm as in Dames et al., "Efficient Optical Elements to Generate Intensity Weighted Spot Arrays: Design and Fabrication," Appl. Opt. 30, 2685–2691 (1991), was used to find the optimum diffractive optics mask for a desired output pattern. The data file from the program has information on grating with identical cells subdivided into pixels where each pixel has a given etch depth corresponding to a given phase. For a binary diffractive optical element, there are 0 and $\pi$ phases with 44% diffraction efficiency and etch depth $\lambda/2(n-1)$, where $\lambda$ is the laser wavelength and n is the index of refraction. N-level phase steps with etch depths $\lambda/2^N(n-1)$ approach maximum efficiency the greater the phase steps level number N. The etching pattern for a diffractive optical element which predetermines the number of beams based on this approach is generated and stored in a data file. The data file is fed into an e-beam or laser lithography writer which exposes a photoresist coated substrate such as quartz. After the photoresist is developed, reactive ion etching forms channels in the quartz to the right depths. The remaining photoresist is stripped and cleaned and the diffractive optical mask is ready for use.

In FIG. 1, a plurality of fan-out beams 6 are produced by diffractive optical element 5. Fan-out beams 6 are formed in the far-field at the focal plane of a positive lens 7. The Fourier transform of the field image after the transmission through the diffractive optics occurs at the lens focal plane. Beams 6 are focused onto either product 8 or harmonic generator 9, depending on the position of reflector 10. Reflector 10 is a high reflector (e.g. a full silvered mirror) in the illustrated embodiment. Reflector 10 is a 45° turning mirror. This can be a glass coated with multilayer dielectric film for 45° reflection at a given laser wavelength. A suitable turning mirror is available from CVI Laser Corporation in Albuquerque, N. Mex.

Reflector 10 is moved into the path of beams 6, as illustrated in FIG. 1, to deflect beams 6 onto product 8. Product 8 is located on sample stage 11 at material treatment station I. Reflector 10 is moved to a position out of the path of beams 6 (a position illustrated in phantom in FIG. 1) to allow fan-out beams 6 to focus onto harmonic generator 9.

Harmonic generator 9 of the illustrated embodiment is a harmonic crystal adapted to convert the energy of fan-out beams 6 having fundamental wavelength $\lambda$ into harmonic beams 12 having energy of harmonic wavelength $\lambda/2$ in the illustrated embodiment. This harmonic generation ($\lambda/2$) is accomplished by means of a KDP* (Deuterated Potassium Dehydrogen Phosphate) crystal cut for the fundamental wavelength $\lambda$. A suitable crystal is available from Cleveland Crystals Inc. in Cleveland, Ohio.

Figure 2:
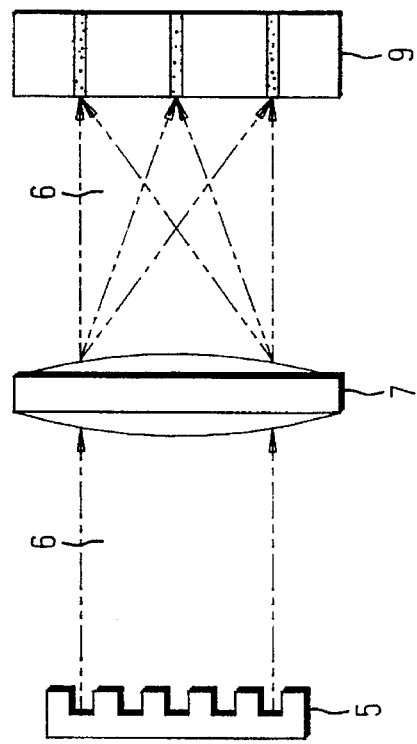
FIG. 2 is a side plan view of exemplary harmonic generation apparatus which uses parallel fan-out beams.

FIG. 2 illustrates the simultaneous focusing of fan-out beams 6 on harmonic generator 9. By focusing beams 6 on several locations of harmonic generator 9, which is accomplished by creating the fan-out beams rather than focusing a single beam on the crystal, more efficient use of crystal volume is achieved. Suitable management of thermal stresses and ideal spreading of intensity over larger areas is accomplished. This is as compared to a single high intensity beam of the fundamental wavelength being focused on the crystal. As a result of spreading the intensity in this manner, crystal reliability is improved. In addition, higher power conversion efficiencies are possible. The multiple beams allow use of a large area of the crystal while the unused spacing between beams allows for thermal dissipation. This helps in pumping the crystal with higher powers in the fundamental and producing higher powers at the harmonic wavelengths. This is in contrast to the power limitation in the conventional single axial beam due to thermal stress on the crystal.

Returning to FIG. 1, harmonic beams 12 produced by harmonic generator 9 are transmitted to downstream stations II and III. Relay lens 13 is used to relay beams 12 to either product 14 on stage 15 or to harmonic generator 16, depending on the position of dichroic mirror 17. As at station I, dichroic mirror 17 is placed in the path of beams 12 to deflect beams 12 onto product 14. Alternatively, dichroic mirror 17 may be removed from the path of harmonic beams 12. In this instance, beams 12 are relayed to harmonic generator 16.

The wavelength of the beams applied by the harmonic generator 16 is determined by the harmonic generator 9. In the exemplary embodiment, the wavelength of beams 22 is $\lambda/4$. Beams 22 can be relayed by relay lens 18 and dichroic mirror 19 onto product 20 disposed on stage 21 in station III.

Using the illustrated embodiment, three separate wavelengths are available for fan-out beams 6 using a single diffractive optical element 5. The appropriate wavelength can thus be produced for any sample by placing the sample at the appropriate station and focusing the beams on that station. Polymer films that are most effectively processed with shorter wavelengths may be treated at one station. Metals that require longer wavelengths can be treated at another station. It is noted that the harmonic wavelength beams have lower energy than the fundamental wavelength beams because of conversion efficiencies.

Figure 3D:
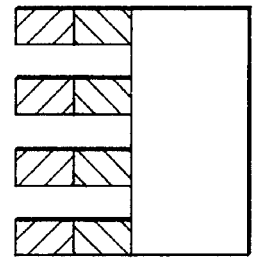
FIGS. 3(a)–3(d) are side plan views of exemplary multiwavelength laser process steps for a multilayer product having multimaterial composition.
Figure 3C:
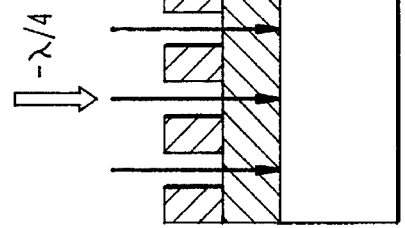
Figure 3B:
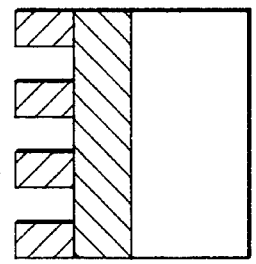
Figure 3A:
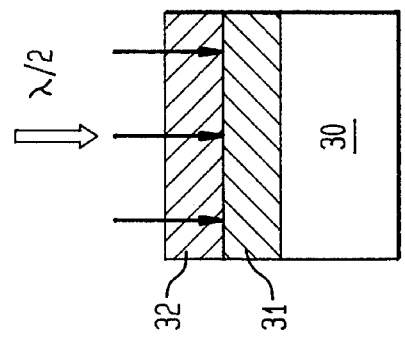

FIGS. 3(a)–3(d) illustrate an alternative material treatment embodiment wherein a product made of substrate 30 and two layer coatings 31 and 32 is treated. In this embodiment, beams of a first wavelength $\lambda/2$ are focused on coating 32 as shown in FIG. 3(a). The first wavelength corresponds to that required to appropriately treat material 32. FIG. 3(b) illustrates the result of that treatment.

Bottom layer 31 is then treated at the next processing stage with a second harmonic wavelength appropriate for that material. The harmonic wavelength in this exemplary embodiment is $\lambda/2$. Treatment is illustrated in FIG. 3(c). Appropriate alignment of the sample is desirable in this embodiment to ensure accurate treatment. The resulting product is shown in FIG. 3(d).

Using the present invention, multiple laser beams having multiple wavelengths can be generated in an efficient manner for treating a plurality of materials simultaneously or treating the same material with different wavelength light in series.

Although this invention has been described with reference to particular embodiments, it is not intended to be limited thereto. In particular, any number of harmonic generators may be used, and separate diffractive optical elements may be used for each laser beam generated at a fundamental wavelength. The scope of the invention is intended to be interpreted in accordance with the scope of the appended claims.

What is claimed:

1. A laser apparatus comprising;

(a) means for generating at least one laser light beam at a fundamental wavelength;

(b) diffractive means for converting said laser light beam into a plurality of light beams at the fundamental wavelength; and (c) harmonic generator means for converting said plurality of light beams at the fundamental wavelength into respective light beams having respective wavelengths which are harmonically related to the fundamental wavelength after said laser light beam has been converted into said plurality of light beams, whereby said plurality of light beams at the fundamental wavelength produce reduced thermal stress in said harmonic generator means, and more efficiently use harmonic generator means volume, than a single laser light beam at the fundamental wavelength.

2. A laser apparatus as claimed in claim 1 wherein said means for converting said laser light beam into a plurality of light beams at the fundamental wavelength is a fan-out diffractive optical mask.

3. A laser apparatus as claimed in claim 1 wherein said means for converting said plurality of light beams at the fundamental wavelength into a plurality of light beams of harmonic wavelengths comprises a harmonic crystal.

4. Apparatus for generating multiple light beams having a predetermined wavelength comprising:

a coherent light source which provides a light beam having a fundamental wavelength;

diffractive means for separating the light beam into multiple coherent light beams; and a harmonic generator crystal, configured to receive each of the multiple coherent light beams at respectively different locations, to provide the multiple light beams having the predetermined wavelength after said diffractive means separates said light beam into said multiple coherent light beams, whereby the multiple coherent light beams produce reduced thermal stress in the harmonic generator crystal, and more efficiently use harmonic generator crystal volume, than a single light beam at the fundamental wavelength.

5. The apparatus of claim 4 wherein the means for separating the light beam provided by the light source into multiple light beams comprises:

a beam expander-collimator which receives the light beam and provides an expanded light beam having a wider cross-section than the light beam provided by the light source; and a diffractive optical element having predetermined etched patterns which transform the expanded light beam into the multiple light beams.

6. A method of generating a plurality of laser light beams at a plurality of wavelengths comprising;

(a) generating at least one laser light beam at a fundamental wavelength;

(b) converting said laser light beam at the fundamental wavelength into a plurality of light beams at the fundamental wavelength; and then (c) converting said plurality of light beams at the fundamental wavelength into a plurality of light beams at wavelengths which are harmonically related to the fundamental wavelength using a harmonic generator, whereby said plurality of light beams at the fundamental wavelength produce reduced thermal stress in said harmonic generator, and more efficiently use harmonic generator volume, than a single laser light beam at the fundamental wavelength.

7. The method of claim 6 wherein a diffractive optical element is used to convert said laser light beam into a plurality of laser light beams at fundamental wavelengths and a harmonic crystal is used to convert said plurality of light beams at the fundamental wavelength into said plurality of light beams which are harmonically related to the fundamental wavelength.

8. The method of claim 7 wherein a plurality of harmonic crystals are used in series.

9. The method of claim 6 wherein said plurality of light beams at the fundamental wavelength are simultaneously converted into light beams which are harmonically related to the fundamental wavelength.

10. A method of treating a material that comprises the steps of:

(a) generating at least one laser light beam;

(b) converting said laser light beam at a fundamental wavelength into a plurality of light beams at the fundamental wavelength;

(c) then converting said plurality of light beams at a fundamental wavelength into a plurality of beams which are harmonically related to the fundamental wavelength using a harmonic generator; and (d) directing said light beams at a fundamental wavelength and said light beams at a harmonic wavelength onto a material, whereby said plurality of light beams at the fundamental wavelength produce reduced thermal stress in said harmonic generator, and more efficiently use harmonic generator volume, than a single laser light beam at the fundamental wavelength.

11. A method for material treatment as claimed in claim 10 wherein said material has at least a first and a second layer and said step of directing comprises directing a light beam at a fundamental wavelength onto said first layer of said material and directing a light beam at a harmonic wavelength onto said second layer of said material.

\* \* \* \* \*